(12) United States Patent
Lubin et al.

(10) Patent No.: US 11,604,612 B1
(45) Date of Patent: Mar. 14, 2023

(54) SYSTEM AND METHOD FOR ANALYZING DECURLER SETTINGS USING AUGMENTED REALITY

(71) Applicant: Xerox Corporation, Norwalk, CT (US)

(72) Inventors: Dara Nanette Lubin, Pittsford, NY (US); Elizabeth Lee Barrese, Penfield, NY (US); Ron Edward Dufort, Rochester, NY (US); Matthew James Ochs, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/448,222

(22) Filed: Sep. 21, 2021

(51) Int. Cl.
*G06F 3/12* (2006.01)
*H04N 1/00* (2006.01)
*G06T 19/00* (2011.01)

(52) U.S. Cl.
CPC .......... *G06F 3/1208* (2013.01); *G06F 3/1256* (2013.01); *G06T 19/006* (2013.01); *H04N 1/00257* (2013.01); *H04N 1/00411* (2013.01); *H04N 1/00647* (2013.01)

(58) Field of Classification Search
CPC ... G06F 3/1208; G06F 3/1256; G06T 19/006; H04N 1/00257; H04N 1/00411; H04N 1/00647
USPC .......................................... 358/1.15
See application file for complete search history.

(56) References Cited

U.S. PATENT DOCUMENTS

| | | | |
|---|---|---|---|
| 5,848,347 A * | 12/1998 | Kuo | G03G 15/6576 399/406 |
| 6,898,307 B1 | 5/2005 | Harrington | |
| 8,559,030 B2 | 10/2013 | Tsongas et al. | |
| 9,036,173 B2 | 5/2015 | Thomas et al. | |
| 10,773,917 B1 * | 9/2020 | Irizarry | B65H 29/70 |
| 10,860,263 B1 * | 12/2020 | Ruiz | G06F 3/1273 |
| 11,062,184 B1 | 7/2021 | Parsons et al. | |

\* cited by examiner

*Primary Examiner* — Darryl V Dottin
(74) *Attorney, Agent, or Firm* — Simpson & Simpson, PLLC (57) ABSTRACT

A method of analyzing decurling settings for a print request including a plurality of sheets, the method including receiving a real image of a first portion of the plurality of sheets, receiving a first input, displaying one or more decurler settings, and displaying a first augmented image of a stack of the plurality of sheets.

30 Claims, 8 Drawing Sheets

SYSTEM AND METHOD FOR ANALYZING DECURLER SETTINGS USING AUGMENTED REALITY

FIELD

The present disclosure relates to the field of printing systems, and more particularly, to decurling of substrates in printing systems, and even more particularly, to a system and method for analyzing decurler settings for targeted decurling of a substrate using augmented reality.

BACKGROUND

Print media, e.g., paper, is typically made by pressing various combinations of moist fibers together and drying them into flexible sheets. The fibers are often obtained from cellulose pulp derived from wood, rags, or grasses. When pressed together, the cellulose fibers overlap forming a substantially homogenous sheet, which is then heated to remove natural moisture from the fibers. As a result of using fibrous cellulose as the base material, paper is highly susceptible to changes in moisture content. During xerographic printing processes, heat is applied to the print media causing a loss in overall moisture content, while during inkjet printing processes, aqueous and solvent based inks are applied to the surface of print media and cured with a radiant energy source, e.g., an ultra-violet or infrared lamp. Additionally, as most of these printing processes result in images being applied that rarely extend to the edges of the print media, there is typically an uneven discrepancy between the moisture content at the edges of the print media and the moisture content at the center of the print media. Furthermore, changes in environmental humidity and variations in thickness of the print media further contribute to undesirable changes in the moisture content of the print media.

Changes in overall moisture content and uneven moisture content between the center of the print media and the edges of the print media can lead to a phenomenon called curling. Curling refers to the angular displacement of the corners (or inner areas) of a sheet of print media with respect to the planar surface of that sheet of print media. Curling of the corners of the print media can lead to paper jams, uneven stacking and finishing in the commercial printing environment, as well as other printing issues.

Some previous methods for compensating for curling include running the processed print media through a decurler. A decurler typically includes at least one set of rollers that will apply a physical force to the print media to induce a curl in the opposite direction of the curl induced through known printing processes. However, the induced curl must be estimated and set prior to processing a print job and such induced curl is determined based on the average expected curl. This method is based on a statistical average curl and is not based on individual sheets of print media or a resulting stack of print media. Thus, such conventional decurlers operate using an estimation of anticipated curling.

Other decurler systems require manual adjustment in order to adjust the output curl from the decurler subsystem. The manual adjustment is performed if the amount of curl in the substrate is causing a stacking performance problem or a factor in paper jams. In such systems, the operator must look at the printed sheets in the output stacker, decide the direction (e.g., upcurl or downcurl) and the amount of curl, and select which of the decurler subsystems to manually adjust, as well as the magnitude of the curling effect of the selected decurler subsystems. The decurler subsystems indent (i.e., the curling rollers engage the substrate) and flatten the substrate to improve runnability and stack quality. Such adjustment is made incrementally by the operator until the desired output is obtained.

However, due to the duplex path and the inverter subsystems as well as the inversion in the stacker, the operator faces a time-consuming decision tree to understand if the curl on the stacked sheet has been inverted, and whether upcurl or downcurl needs to be improved. Furthermore, the amount of curl is dependent on the paper itself and the amount of ink or toner on the page. Thus, the operator spends time and paper iterating through the proper decurler subsystem adjustments to get the desired runnability and stack quality.

Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). AR is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive and digitally manipulated. Information about the environment and its objects is overlaid on the real world. This information can be virtual. AR is any experience which is artificial and which adds to the already existing reality.

Thus, there is a need for a system and method for system and method for analyzing decurler settings for targeted decurling of a substrate using AR.

SUMMARY

According to aspects illustrated herein, there is provided a method of analyzing decurling settings for a print request comprising a plurality of sheets, the method comprising receiving a real image of a first portion of the plurality of sheets, receiving a first input, displaying one or more decurler settings, and displaying a first augmented image of a stack of the plurality of sheets.

In some embodiments, the step of receiving the first input comprises receiving one or more factors related to the print request. In some embodiments, the one or more factors comprises at least one of a sheet stock weight, a sheet size, a sheet coating, a sheet grain direction, a simplex or duplex print, a sheet weight, a sheet ink coverage, and an output orientation setting. In some embodiments, the method further comprises prior to receiving the first input, displaying one or more factors related to the print request. In some embodiments, the method further comprises, after displaying the one or more decurler settings, receiving a second input. In some embodiments, the second input relates to the one or more decurler settings. In some embodiments, the second input relates to a request to display the first augmented image of the stack of the plurality of sheets. In some embodiments, the step of displaying the first augmented image of the stack of the plurality of sheets comprises based on at least one of the real image, the first input, and the displayed decurler settings, predicting a geometry of the stack formed by the plurality of sheets. In some embodiments, the method further comprises, after the step of displaying the first augmented image of the stack of the plurality of sheets receiving a second input adjusting the one or more decurler settings, and displaying a second augmented image of the stack of the plurality of sheets. In some embodiments, the method further comprises, from the real image, detecting a curvature of the plurality of sheets. In some embodiments, the method further comprises, from the real image, determining if the plurality of sheets comprises a whole-page curl, a local curl, or a cockle.

According to aspects illustrated herein, there is provided a system for analyzing decurling settings for a print request comprising a plurality of sheets, the system comprising one or more computer processors, one or more computer readable storage media, a camera, program instructions stored on the computer readable storage media for execution by at least one of the one or more computer processors, the program instructions comprising program instructions to receive a real image of at least one sheet of the plurality of sheets, program instructions to receive a first input, program instructions to display one or more decurler settings, and program instructions to display a first augmented image of a stack of the plurality of sheets.

In some embodiments, the program instructions to receive the first input comprise receiving one or more factors related to the print request. In some embodiments, the one or more factors comprises at least one of a sheet stock weight, a sheet size, a sheet coating, a sheet grain direction, a simplex or duplex print, a sheet weight, a sheet ink coverage, and an output orientation setting. In some embodiments, the system further comprises program instructions to, prior to receiving the first input, display one or more factors related to the print request. In some embodiments, the system further comprises program instructions to, after displaying the one or more decurler settings, receive a second input. In some embodiments, the second input relates to the one or more decurler settings. In some embodiments, the second input relates to a request to display the first augmented image of the stack of the plurality of sheets. In some embodiments, the program instructions to display the first augmented image of the stack of the plurality of sheets comprise program instructions to, based on at least one of the real image, the first input, and the displayed decurler settings, predict a geometry of the stack formed by the plurality of sheets. In some embodiments, the system further comprises, after the program instructions to display the first augmented image of the stack of the plurality of sheets, program instructions to receive a second input adjusting the one or more decurler settings, and program instructions to display a second augmented image of the stack of the plurality of sheets. In some embodiments, the camera is fixed relative to the stack.

According to aspects illustrated herein, there is provided a method of analyzing decurling settings for a print request comprising a plurality of sheets, the method comprising receiving, by a camera, a real image of a first portion of the plurality of sheets, and based on the real image, displaying, by one or more computer processors, an augmented image of a stack of the plurality of sheets.

In some embodiments, the step of displaying the augmented image of the stack of the plurality of sheets comprises determining, by the one or more computer processors, a first geometry of the first portion in the real image, and predicting, by the one or more computer processors, a second geometry of the stack.

According to aspects illustrated herein, there is provided a method of analyzing operational settings for an apparatus processing a plurality of sheets, the method comprising receiving a first real image of the plurality of sheets, receiving a first input relating to the processing of the plurality of sheets, and processing the plurality of sheets according to data derived from the first real image and the first input.

In some embodiments, the processing includes printing on the plurality of sheets. In some embodiments, the processing includes decurling the plurality of sheets. In some embodiments, the method further comprises receiving a second real image of the processed plurality of sheets, receiving a second input relating to the processed plurality of sheets, and processing the processed plurality of sheets according to data derived from the second real image and the second input. In some embodiments, the first real image is received from a camera fixed relative to the plurality of sheets. In some embodiments, the processing includes displaying an augmented image of a stack of the plurality of sheets. In some embodiments, the first input relates to at least one of a sheet stock weight, a sheet size, a sheet coating, a sheet grain direction, a simplex or duplex print, a sheet weight, a sheet ink coverage, a sheet color, and an output orientation setting. In some embodiments, the first real image of the plurality of sheets comprises a stack of the plurality of sheets. In some embodiments, the stack of the plurality of sheets is arranged on an input side of the apparatus. In some embodiments, the stack of the plurality of sheets is arranged on an output side of the apparatus. In some embodiments, the method further comprises, from the first real image, detecting a curvature of the plurality of sheets, wherein the data is derived at least partially from the curvature. In some embodiments, the method further comprising, from the first real image, determining if the plurality of sheets comprises a whole-page curl, a local curl, or a cockle.

In some embodiments of the present disclosure, the operator sends one or more pages of the job that represents the typical sheets in the print job to the stacker pallet. The operator opens the application or program and selects from a menu of options, which are factors driving the required decurler settings, for example, stock weight, size, coating (e.g., gloss or uncoated), grain direction, simplex or duplex path, weight, ink coverage (i.e., low, medium, or high area coverage or overall average area coverage). The operator opens the stacker door and frames the camera view on the portion of the sheet on the stacker pallet. The real printed sheet or sheets are there, with the amount and location of ink area coverage used in the print job, which directly influences curl. The program then takes these factors and suggests which decurler to adjust, and by how much. The program uses AR and provides a visual representation of the sheet after the decurler settings are applied. This visual representation is important because the resultant sheet still may not be completely flat. There may always be a small amount of curl on the trail edge, for example, if there is a border of high area coverage in a band on the trail edge. The operator can then have a visual representation of what the outcome will be after he applies the suggested settings.

The AR also represents what the stack looks like by projecting a simulated end result. If the operator makes the recommended adjustment, and then provides an input (e.g., swiping up), the program will show what 500 or 1,000 sheets in the stack will look like. It should be appreciated that the program can simulate any number of sheets. The AR uses an algorithm to extend the stack geometry, using the paper weight, thickness, size, etc. The operator can also be proactive about maximum stack height and run 500 instead of 2,000 in the case of a non-uniform sheet such as specialty media like tipped-on ID cards at one end of a sheet. In the program, the operator can provide an input (e.g., slide a finger up and down) to adjust the desired stack height prediction. In some embodiments, the program may indicate that the stack height is exceeded (e.g., a red flash, sound, haptic, etc.).

In some embodiments, the present disclosure comprises an AR based application using the visual of the real oriented sheets to suggest decurler settings and save time for the operator. The present disclosure allows for automatic calculation of decurler settings based on the actual sheet and suggestion to the operator to make decisions about the non-volatile memory (NVM) settings, namely, the one or more curlers to activate and at what magnitude the selected curlers should indent, or engage, the substrate. The present disclosure allows for immediate evaluation and suggestions using a view of the printed sheet (e.g., side view). The present disclosure utilizes AG to extend the stack geometry and visually represents the predicted stack. The present disclosure saves time and paper, and removes the guesswork and need to print the sheet several times with different NVM or path settings. The present disclosure allows the operator to predict the stack geometry. The present disclosure uses existing hardware so no new material costs are incurred.

According to aspects illustrated herein, there is provided a camera-based application that characterizes a printed sheet and provides a menu of decurler subsystem settings.

According to aspects illustrated herein, there is provided a camera-based application that uses AR to help the operator visualize how the stack will look if the operator uses the suggested decurler settings.

In some embodiments, the present disclosure proposes the use of a mobile application with AR technology to analyze physical output geometry in the stacker and job attribute settings to recommend and anticipate issues with configuration that could cause paper jams and other problems due to curl. The application would utilize real world output sheet geometry, prompt for input parameters on certain attributes, and then be able to show a predictive AR representation of current state as well as what the recommended settings would produce in the stacker for various run sizes. While this would be particularly beneficial for production printing where automatic decurling algorithms may not currently exist, the concept could be applied to any decurling use case. Some benefits of the present disclosure include, inter alia, 1) reducing waste due to paper/tray parameter misconfiguration leading to paper jams, and 2) reducing downtime and associated service costs, thereby improving runtime.

In some embodiments, the program can be used to simulate/investigate results for any settings (i.e., not just the recommended settings). While the program can be used to visualize a system-recommended setting (i.e., to minimize curl defects overall), a user might want to manually adjust each decurler and see what happens. The user might accept increased curl in one area, for example, the trail edge, while lowering curl in a different area, for example, the lead edge, that is more important to their workflow (i.e., to facilitate feeding into another machine). The visualization of the resulting stack would change via the adjustments.

In some embodiments, in addition to the decurler settings changing, the job parameters could likewise be adjusted and reflected in the AR simulation. If the user initially uses the AR program to visualize a job as programmed, they could then change media type, for example, from a coated stock to an uncoated stock, and observe if the simulated stack changes.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of and" comprising at least one of in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

As used herein, "fusing," with respect to dry marking material such as toner, is intended to mean supplying heat energy and/or pressure, having the effect of slightly liquifying the applied dry marking material (toner) particles, in turn causing them to adhere to a surface. "Drying," as used herein, is intended to mean applying energy, typically but not necessarily heat in radiant and/or convective form, having the effect of causing a liquid component of the ink (a liquid marking material) to evaporate. "Curing," as used herein, for example with respect to IR inks (liquid marking material) is intended to mean applying energy, such as by typically but not necessarily infrared waves, having the effect of causing a chemical reaction within at least one component of the applied ink, thereby fixing the ink to a surface.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose.

"Real image," as used herein refers to a perspective image of a stack of sheets, excluding two-dimensional scanning as would be performed by a scanner or copier.

Furthermore, as used herein, "sheet," "web," "substrate," "printable substrate," and "media" refer to, for example, paper, transparencies, parchment, film, fabric, plastic, photofinishing papers, or other coated or non-coated substrate media in the form of a web upon which information or markings can be visualized and/or reproduced. By specialty sheet it is meant a sheet which includes a card, label, sticker, pressure seal envelopes, mailers, or other element that is thicker than the substrate on or in which it resides.

Figure 1:
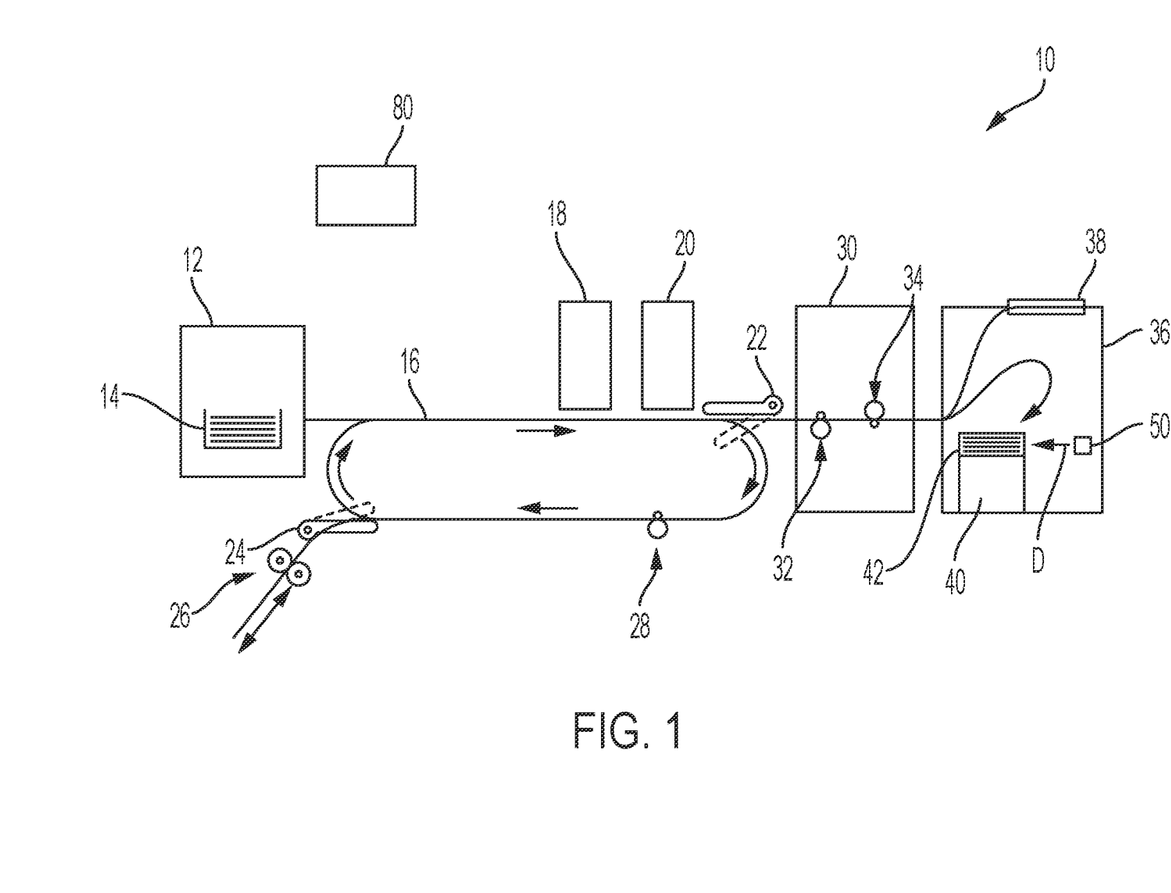
FIG. 1 is a simplified elevational view showing the relevant parts of a printing system, in accordance with some embodiments of the present disclosure.

Referring now to the figures, FIG. 1 is a simplified elevational view showing the relevant parts of printing system 10, in accordance with some embodiments of the present disclosure. Printing system 10 generally comprises feeder module 12 including one or more feeder trays 14, simplex or duplex loop 16, marker or print head 18, one or more gates (e.g., gates 22 and 24), one or more inverters (e.g., inverter 26), decurler or duplex decurler 28, curling module 30 including one or more decurlers 32 and 34, output module 36 including pallet 40 operatively arranged to support stack of print sheets or substrates 42 and top or proofing tray 38, and camera 50. Printing system 10 communicates with central controller 80 to implement the printing path schedule created by a scheduler program. Printing system 10 is capable of simplex or duplex output, in which a stream of images (or digital video signals representative of images) desired to be printed causes the desired images to be formed on a selected side of a print sheet or substrate. The particular embodiment shown in FIG. 1 illustrates an ink-jet printer; however, it should be appreciated that the present disclosure could be implemented on other types of image-creation technologies, such as electrostatographic or xerographic printers (i.e., toner).

Feeder module 12 is operatively arranged to feed sheets on which to print images from feeder tray 14 to loop 16. Printing system may comprise a plurality of feeder trays 14 wherein the sheets in feeder trays 14 may differ in attributes, for example, size, color, stock weight, coating, grain direction, or the presence of a pre-printed letterhead. When it is desired to create an image on a sheet, a sheet of a desired type is drawn from a feeder tray, and the individual sheet is fed onto loop 16. It should be appreciated that printing system 10 may comprise any number of feeders and feeder trays. Feeder module 12 communicates with central controller 80 such that it feeds sheets to loop 16 in proper synchronization with the printing path schedule created by the scheduler program.

Loop 16 generally comprises an endless belt which is capable, by means of friction, static electricity, vacuum, or other means, of retaining a plurality of sheets thereon, thereby retaining a particular sheet until it is time for the sheet to receive an image on the side of the sheet facing outwardly from the belt of the loop 16. In the embodiment shown in FIG. 1, it is intended that sheets "ride" on the outer surface of the belt of the loop 16. Along one portion of loop 16, the belt of loop 16 comes into close contact with marker or print head 18, which may transfer an image onto the side of the sheet facing outwardly from the belt of loop 16. In some embodiments, marker or print head 18 comprises one or more ink jet print heads. In some embodiments, marker or print head 18 comprises a photoreceptor belt, a transfer corotron, and an imager in accordance for use with toner (i.e., xerography). Marker 18 transfers the image onto a side of a sheet. If at this point the sheet having the image thereon is desired to be output from the system, a device such as gate 22, a simple design of which is shown in FIG. 1, but which may be of any number of designs known in the art, will cause the sheet to be disengaged from loop 16 and output from the printing module, for example, to curling module 30. In some embodiments, the sheet may be passed through dryer or fuser or curer 20 either before or after being output from loop 16. as is known in the art.

To create a duplex print, that is, a print having one desired image on one side thereof and another desired image on the other side thereof, it is necessary to make the other side of the sheet available to marker 18, by causing the other side of the sheet to face outward while the sheet rides on the outside of loop 16. For this purpose, printing system 10 comprises inverter 26 operatively arranged along loop 16. Inverter 26 is operatively arranged to remove a sheet from loop 16 which comprises an image already arranged on the outward-facing side thereof, and turn the sheet over so that the other, "non-printed" side of the sheet faces outward from the belt of loop 16. Thus, inverter 26 removes the sheet from loop 16, feeding it in one direction, and then delivering the sheet back to loop 16 (as shown by the double-headed arrow next to inverter 26) to turn the sheet over (i.e., rotate the sheet 180°). Loop 16 then re-feeds the sheet for another cycle so that marker 18 can place another desired image on the other side thereof. Gate 24 is operatively arranged to selectably cause the sheet to enter inverter 26, depending on whether the particular sheet passing therepast is a simplex print, the first side of a duplex print, or a second side of a duplex print. As shown in FIG. 1, after a front side f image is placed on a sheet at marker 18, this sheet travels around loop 16, is picked off loop 16 by gate 24, inverted by inverter 26, and placed back on loop 16, where the inverted sheet will again become available to receive an image from marker 18 at a time in the future after the inverted sheet makes its way around loop 16.

Printing system further comprises curling module 30. Curling module 30 comprises at least one decurler, for example decurler 32 and decurler 34. Entrance or upstream decurler 32 comprises a first larger and softer roller and a second smaller and harder roller, wherein the sheet is fed through the nip formed by the rollers. This feeding causes the sheet to indent around the first roller which removes the curl in the media sheet in a first direction. Exit or downstream decurler 34 comprises a first larger and softer roller and a second smaller and harder roller, wherein the sheet is fed through the nip formed by the rollers. This feeding causes the sheet to indent around the first roller which removes the curl in the media sheet in a second direction. Thus the combination of decurler 32 and decurler 34 may remove curls in a sheet in both directions. Similarly, loop 16 may comprise decurler 28 on its duplex portion. Decurler 28 is substantially similar to decurlers 32 and 34. In some embodiments, loop 16 comprises two decurlers 28. Decurler 28 is operatively arranged to remove curls in sheets for duplex printing. For example, a sheet having passed through marker 18 and receiving an image on its front side f may exhibit some curl due to the application of ink. Such curl may affect the ability of the sheet to pass under marker 18 for receiving an image on its back side d, since the space between marker 18 and loop 16 is very small. Thus, decurler 28 flattens the sheet to eliminate feeding issues of sheets marked for duplex printing.

Printing system 10 further comprises output module 36. Once sheets are output from curling module 30, they enter output module 36 and are stacked on top of pallet 40. A plurality of sheets stacked on top of each other are referred to herein as stack 42. In some embodiments, stack 42 is arranged on top of pallet 40. In some embodiments, stack 42 is arranged in feeder tray 14 and/or feeder module 12. Pallet 40 is vertically adjustable such that the top of stack 42 is always at the same height. Output module 36, namely pallet 40, is arranged to hold a stack of a predetermined amount of sheets, for example, 2,000 sheets. In an example embodiment, for a 2,000 sheet limit output module 36, a print job wherein 1,500 sheets is desired will be adequately supported and contained on pallet 40, assuming the sheets are flat when stacked. However, for a 2,000 sheet limit output module 36, a print job wherein 2,500 sheets is desired will not be adequately supported and contained on pallet 40. In such instance, after stack 42 reaches 2,000 sheets, pallet 40 ejects from output module 36 where stack 42 can be removed therefrom. Pallet 40 is then returned to its receiving position within output module 36 where it will collect the remaining 500 sheets. The stacking of sheets on pallet 40 to form stack 42 will be greatly affected by curling, as previously described. For example, sheets that exhibit curling will stack uneven and therefore reduce the stack capacity of output module 36 and pallet 40. As such, it is desirable that sheets be as flat as possible prior to being stacked on pallet 40. In some embodiments, output module 36 comprises top tray or proofing tray 38. In such embodiments, if the operator desires, a single sheet in the print job can be sent to top tray 38. The operator can inspect the single sheet for defects, for example, curls, and adjust the print job accordingly.

Printing system 10 further comprises camera 50. Camera 50 is operatively arranged to take an image of the top sheet of stack 42 and/or stack 42 from one or more angles. Camera 50 is directed toward stack 42, for example, in direction D; although camera 50 can be arranged in any direction suitable to obtain an image of stack 42 for the purposes of determining curvature in the sheets therein. Camera 50 is operatively arranged to take one or more photographs of stack 42 and/or the sheets in stack 42 and send them to AR decurling settings analysis program 140, as will be described in greater detail below. In some embodiments, camera 50 is operatively arranged to take one or more images and/or a continuous image (i.e., video) of top sheet of stack 42 and/or stack 42.

Figure 2:
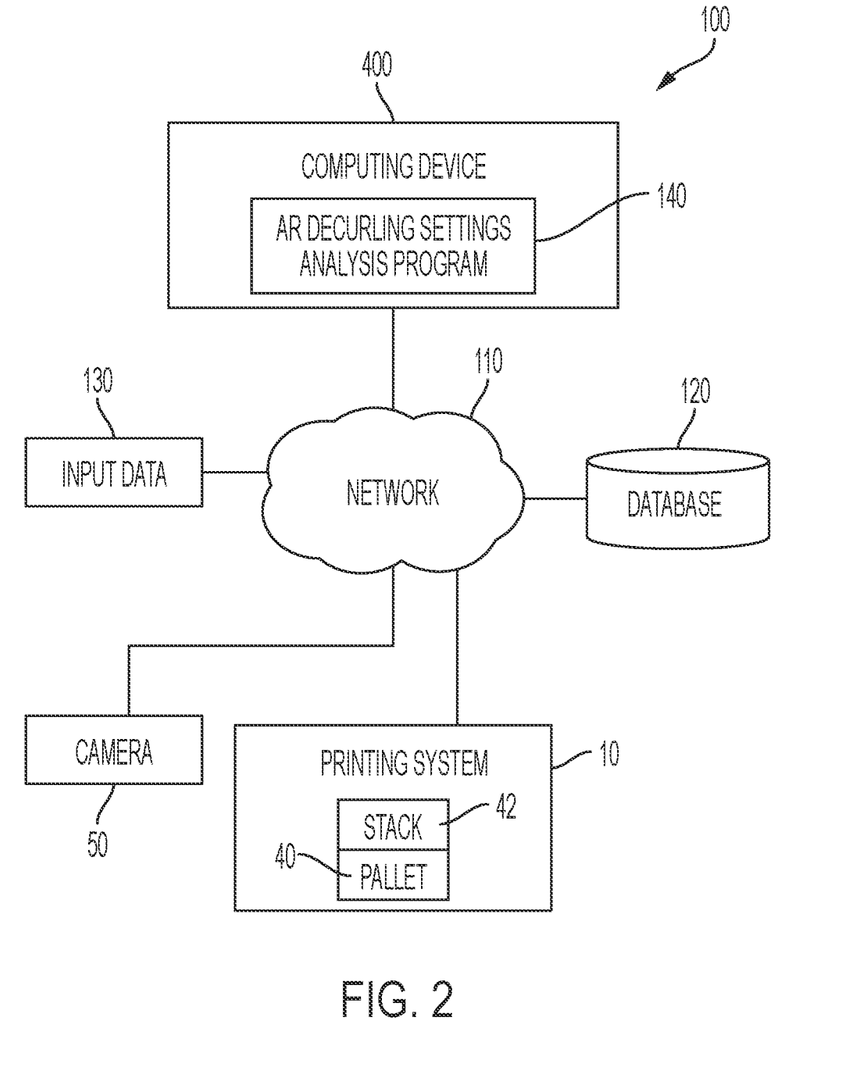
FIG. 2 is a functional block diagram illustrating an environment, in accordance with some embodiments of the present disclosure.

FIG. 2 is a functional block diagram illustrating an AR decurling settings analysis environment, generally environment 100, in accordance with some embodiments of the present disclosure. FIG. 2 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, environment 100 includes computing device 400, database 120, user input data 130, printing system 10, and camera 50 all of which are connected to network 110. In some embodiments, environment 100 further comprises central controller 80, as previously described with respect to printing system 10, which communicates with computing device 400 and/or AR decurling settings analysis program 140. Central controller 80 is the interface between a digital front end for job information, or free flow controller software, and the various relevant components of printing system 10 (hardware), and can be a machine logic controller (e.g., power supply in package controller).

Network 110 can be, for example, a local area network (LAN), a wide area network (WAN) such as the Internet, or a combination of the two, and can include wired, wireless, or fiber optic connections.

Computing device 400 may be a hardware device that produces augmented images based on information received from database 120, input data 130, printing system 10, and/or camera 50 using AR decurling settings analysis program 140. Computing device 400 is capable of communicating with network 110, database 120, input data 130, printing system 10, and camera 50. In some embodiments, computing device 400 may include a computer. In some embodiments, computing device 400 may include internal and external hardware components, as depicted and described in further detail with respect to FIG. 8. In some embodiments, AR decurling settings analysis program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 8.

AR decurling settings analysis program 140 receives information regarding a first portion of a stack. The stack is a plurality of sheets, representing an entire print job, arranged on top of each other in output module 36 of printing system 10. Printing system 10 prints a first portion of the plurality of sheets (i.e., a portion of the stack), and AR decurling settings analysis program 140 received information regarding such first portion. The information can be received in the form of one or more images from camera 50, from printing system 10, from an operator via input data 130, in the form of preexisting values stored in database 120, and/or from central controller 80. For example, in some embodiments, an image of the first portion of the stack on pallet 40 is captured by camera 50 and sent to AR decurling settings analysis program 140. In some embodiments, the operator manually inputs one or more factors via input data 130, for example, stock weight, size, coating (e.g., gloss or uncoated), grain direction, simplex or duplex path, weight, ink coverage (i.e., low, medium, or high area coverage or overall average area coverage), which are received by AR decurling settings analysis program 140. In some embodiments, the one or more factors are retrieved from central control 80 (i.e., the data provided in the specific print job sent to printing system 10). Using the information received, AR decurling settings analysis program 140 displays decurler values, which may be stored in and thus retrieved from database 120 for selection by the operator. Based on the selection of decurler values and the information (e.g., photograph) received, AR decurling settings analysis program 140 displays an augmented image illustrating a prediction of what a full stack will look like. For example, if the first portion of the stack comprises 40 sheets, AR decurling settings analysis program 140 may project what the final stack of 2,000 sheets will look like given the proposed decurler settings. Based on the augmented image, the operator can then determine whether to proceed with printing the remaining 1,960 sheets or alter the decurler settings, which would lead to another updated augmented image.

Database 120 is a central storage for decurler settings. For example, decurler settings may include settings for duplex decurler 28, entrance decurler 32, and exit decurler 34. These settings are referred to as NVM settings since they are retained even after power is removed. The decurler settings may include codes for which decurlers to activate and at what magnitude the selected decurlers will indent (i.e., engage) the sheet. These settings are selected based on the position and magnitude of the sheet's curl. Database 120 can be implemented using any non-volatile storage medium known in the art. For example, authentication database can be implemented with a tape library, optical library, one or more independent hard disk drives, or multiple hard disk drives in a redundant array of independent disks (RAID).

Input data 130 is data inputted by an operator, for example, factors related to the print request such as stock weight, size, coating (e.g., gloss or uncoated), grain direction, simplex or duplex path, weight, ink coverage (i.e., low, medium, or high area coverage or overall average area coverage). The operator may submit input data 130, or designate the appropriate data to be provided by database 120, for example, generic settings that are often used with specific inks, coverages, stock weights, etc. that may be stored in database 120. The system, namely, environment 100, is responsive to input data 130 provided by an operator or read from database 120. As will be explained in greater detail below, AR decurling settings analysis program 140 receives one or more factors regarding the print request from database 120, input data 130, camera 50, printing system 10, and/or central controller 80, and together with an image of the first portion of the stack, displays an augmented image of the estimated complete stack.

In one example, the ink area coverage (i.e., ink amount), lighter weight of the sheet, coating, and sheet size are significant factors that cause curl and ultimately cause the paper to stack poorly. More ink applied to a sheet typically causes more curling, whereas less ink applied to a sheet allows that sheet to stack flatter. In another example, grain direction and length are significant factors that cause curl and poor stacking of sheets. Printing on a sheet with long grain results in different curling than printing on a sheet with short grain. In another example, printing on specialty sheets (e.g., pressure seal envelopes, mailers, etc.) result in curling. Thus, the input data 130 indicates the exact properties of each of these factors such that the resulting curling of each sheet can be rectified according thereto.

Central controller 80 is the interface between a scheduler program and the hardware components of printing system 10. Central controller 80 communicates with the scheduler program to implement the chosen printing path schedule on printing system 10. For example, in some embodiments, central controller 80 may communicate with one or more feeder trays 14, marker or print head 18, one or more gates (e.g., gates 22 and 24), one or more inverters (e.g., inverter 26), to carry out the printing path schedule created by the scheduler program.

Figure 3:
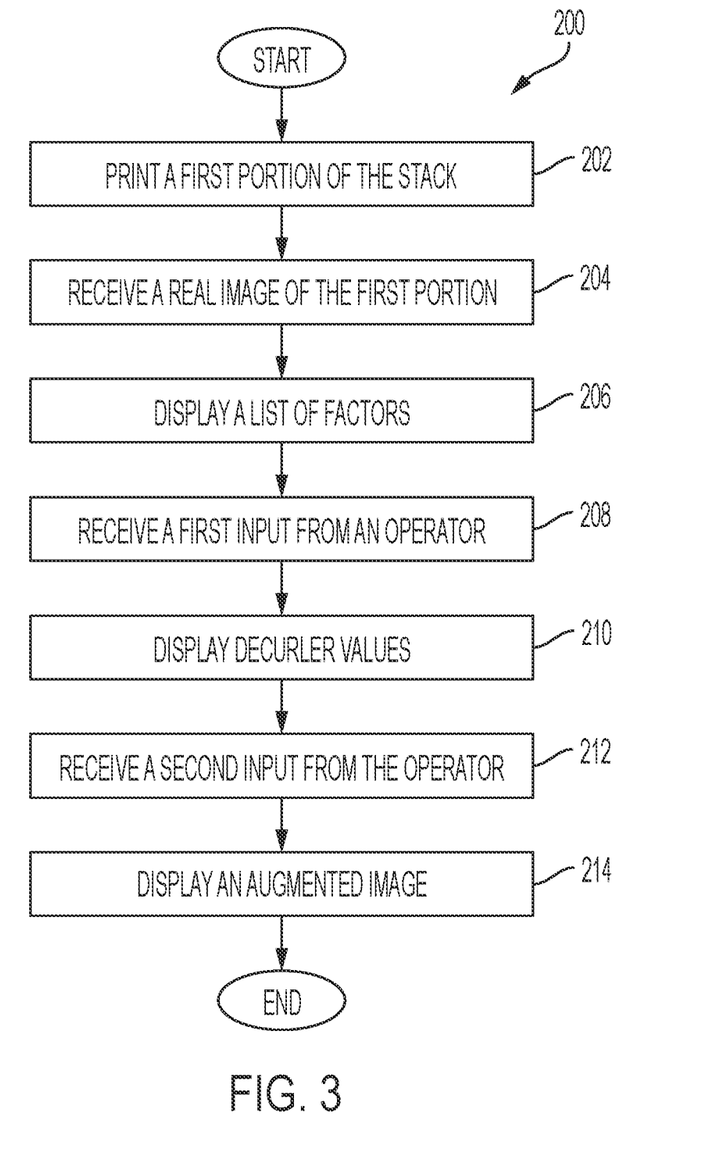
FIG. 3 is a flow chart depicting operational steps for analyzing decurler settings using augmented reality.

FIG. 3 shows flow chart 200 depicting operational steps for analyzing decurler settings using augmented reality, in accordance with some embodiments of the present disclosure.

In step 202, a first plurality of sheets of a print request is printed, which forms a first portion of stack 42, namely, first portion 44. For example, if a print request requires 1,500 sheets, the first portion of the stack may be 50 sheets.

Figure 4:
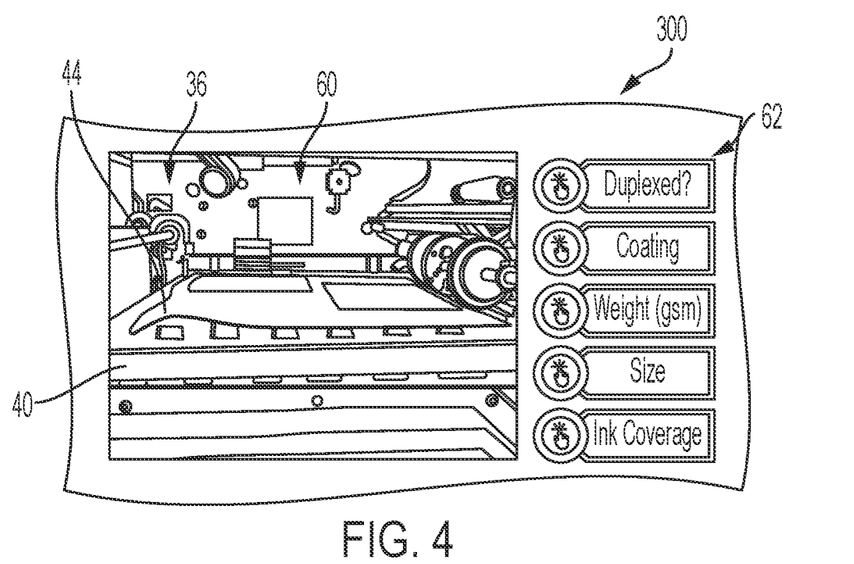
FIG. 4 is a front view of a portion of a display screen showing an embodiment of an icon of an application.

In step 204, AR decurling settings analysis program 140 receives real image 60 of first portion 44 from camera 50. Real image 60 shows the curvature of first portion 44, namely, where the curls are. In some embodiments, as shown in FIG. 4, real image 60 shows first portion 44 arranged on pallet 40 in output module 36, wherein a downcurve is arranged on the left side edge (e.g., trail edge or lead edge).

Figure 10:
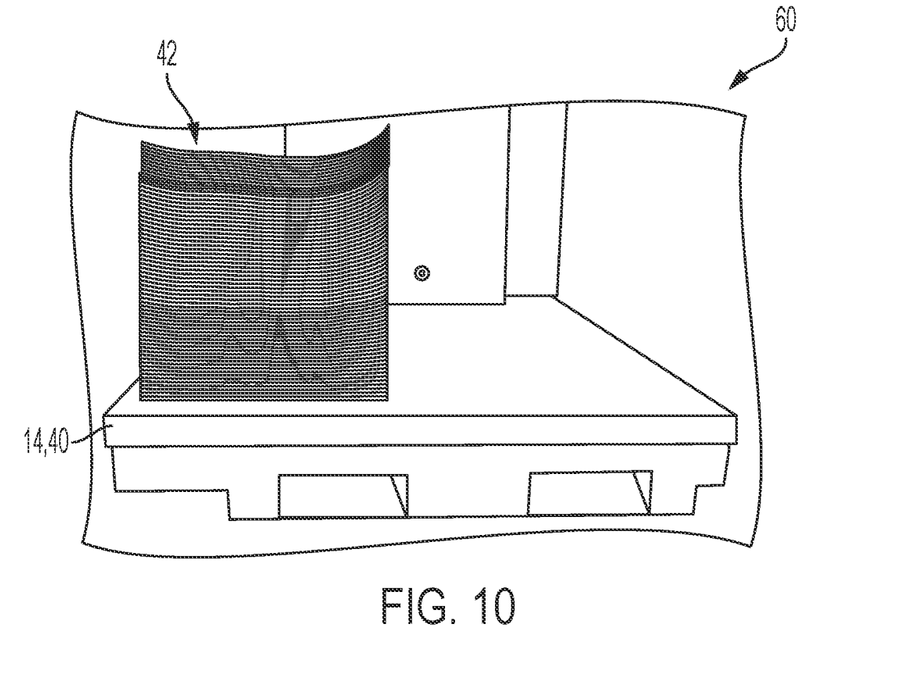
FIG. 10 is a front view of a portion of a display screen showing an embodiment of an icon of an application; and, FIG. 11 is a front view of a portion of a display screen showing an embodiment of an icon of an application.

In some embodiments, in step 204, AR decurling settings analysis program 140 receives real image 60 of stack 42 from camera 50 without printing first portion 44 (i.e., without the need for step 202). For example, an image can be taken of stack 42 prior to printing or processing the sheets of stack 42, for example, in feeder tray 14, and/or after all sheets of stack 42 have been printed on or processed, thereby forming a complete stack 42, for example, in stacker 40. FIG. 10 illustrates real image 60 of stack 42. In some embodiments, a real image can be received of complete stack 42 in feeder tray 14 or prior to printing or processing the sheets thereof, and a real image can be received of the complete stack 42 in stacker 40, or post printing or processing the sheets thereof. The real images can be compared by AR decurling settings analysis program 140 and the decurling settings can be adjusted based thereon.

Figure 5:
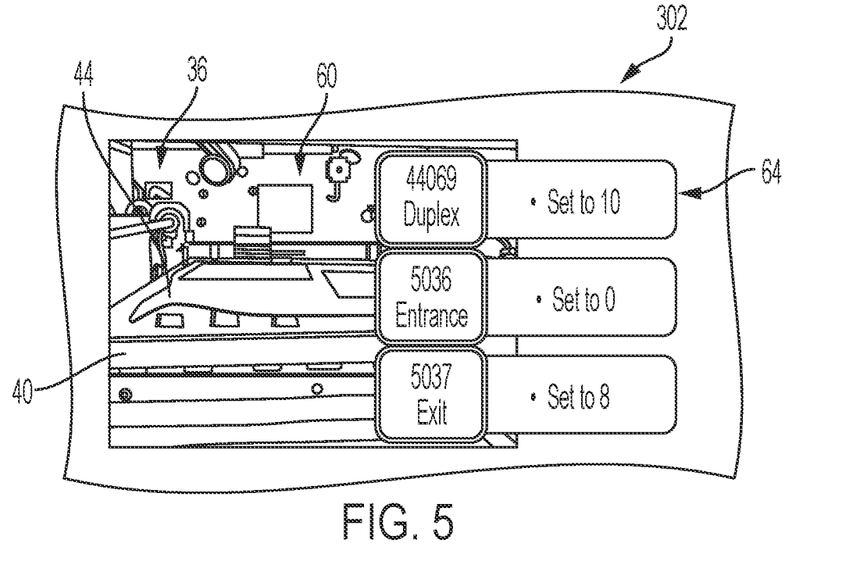
FIG. 5 is a front view of a portion of a display screen showing an embodiment of an icon of an application.
Figure 9:
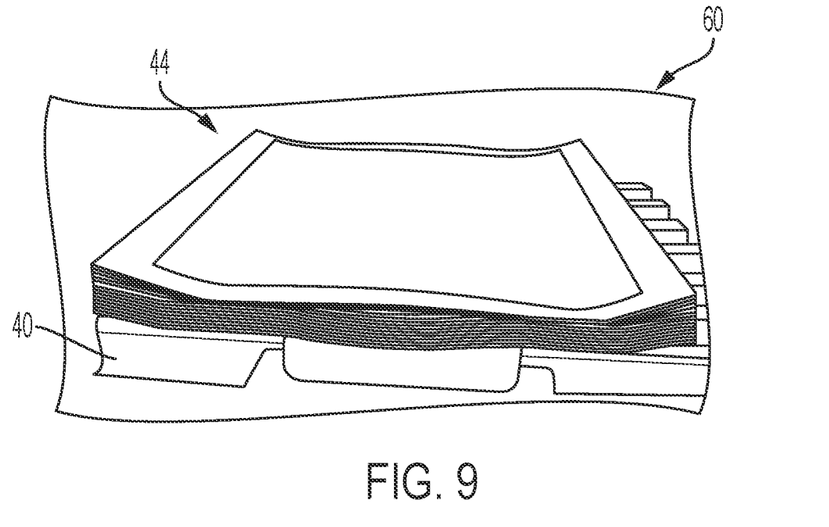
FIG. 9 is a front view of a portion of a display screen showing an embodiment of an icon of an application.

It should be appreciated that first portion 44 may comprise one sheet or a plurality of sheets. Real image 60 is used by AR decurling settings analysis program 140 receives real image 60 to analyze curvature. For example, as shown in FIG. 9, first portion 44 shows a plurality of sheets that exhibit whole-page curl, wherein the entirety of the sheet exhibits a curl (i.e., a U-shape). This differs from a local curl, which is shown in FIGS. 4-5 and 10 wherein just a portion of the sheet curls, for example, a lead edge curl or a trail edge curl. The whole-page curl tends to be inherent to sheets, while a local curve in one corner or edge of the stack may have a different cause (and is possibly caused by the printer, if it is detected in the output stack). A small local curl can be caused by the location of ink or toner in the print job itself or by something in the paper path bending the sheet corner slightly. Decurlers would operate in different ways to address whole-page curls and local curls.

Figure 11:
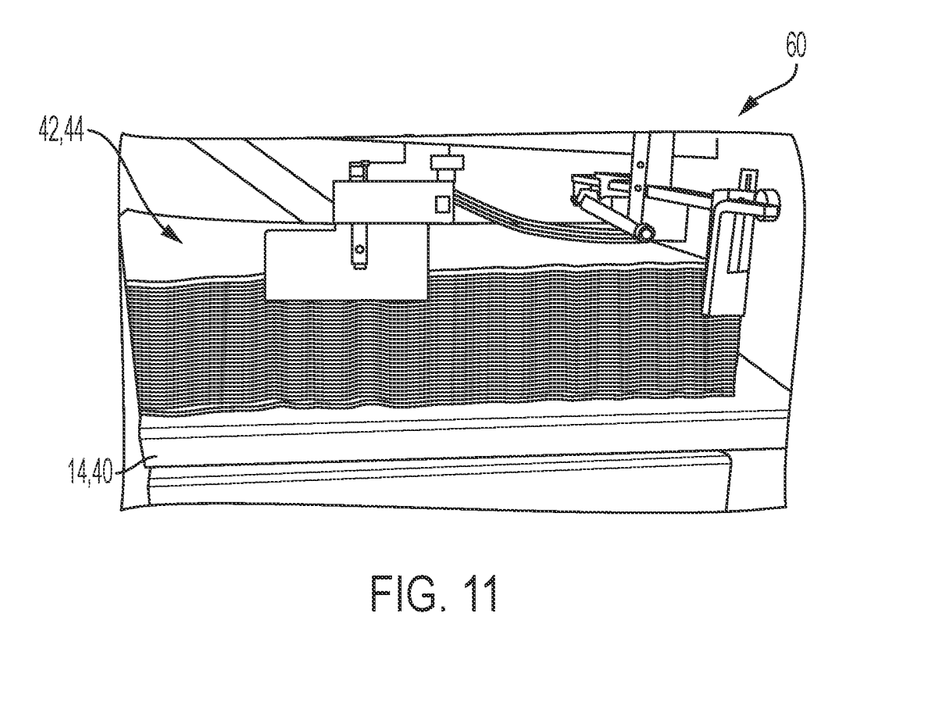

FIG. 11 depicts stack 42 or first portion 44 exhibiting a cockle, which is multiple local curves forming undulations or other nonuniformities in the stack. For example, a cockle may result in a sheet or stack curvature that mimics a sine wave. A cockle may be formed from too much moisture being put into the stack, either deliberately (i.e., by ink or toner) or accidentally (i.e., by ambient humidity). On the output side of printing device 10, a cockle may also be formed from an issue with the decurlers or other mechanism of printing device 10. A cockle is the same as wrinkle on some sheets especially in inkjet printers. In some embodiments, a cockle is caused by water in the ink drying the fibers of the sheet unevenly. In many papers, especially recycled papers, the fibers are uneven in thickness and adding ink magnifies this causing the cockle. In some embodiments, a cockle is caused by an operator mistakenly engaging two decurlers that are close together, resulting in the sheet being pressed by two rollers almost at the same time and from both sides.

In step 206, AR decurling settings analysis program 140 displays a list of factors. FIG. 4 is a front view of portion of a display screen 300 showing an embodiment of an icon of AR decurling settings analysis program 140. Display screen 300 shows icons 62 which include a number of factors. Icons 62 may include, inter alia, the following factors related to the print request: stock weight, size, coating (e.g., gloss or uncoated), grain direction, simplex or duplex path, weight, ink coverage (i.e., low, medium, or high area coverage or overall average area coverage).

In step 208, AR decurling settings analysis program 140 receives a first input from an operator, wherein the first input is related to the list of factors displaced by icons 62. For example, the operator may enter an input indicating the print request requires duplex printing and the weight of the stock. In another example, the operator may enter the area coverage of ink of the print request, that the print request is simplex only and requires a gloss coating. It should be appreciated that in an additional or alternative step, AR decurling settings analysis program 140 receives a first input related to the list of factors from central controller 80 (i.e., data pertaining to the print request itself such as ink coverage, stock grain direction, size and weight, etc.). In some embodiments, in an additional or alternative step, AR decurling settings analysis program 140 receives a first input related to the list of factors from camera 50 (i.e., image analysis software determines the various factors relevant to the print request based on the first portion 44).

In step 210, AR decurling settings analysis program 140 displays decurler values based on the first input and/or real image 60. FIG. 5 is a front view of portion of a display screen 302 showing an embodiment of an icon of an AR decurling settings analysis program 140. Display screen 302 shows icons 64 which include a number of decurler settings. Icons 64 may include, inter alia, an indent setting for duplex decurler 28, an indent setting for entrance decurler 32, and an indent setting for exit decurler 34. Below is a table showing examples of which decurlers should be selected based on sheet curvature and sheet configuration in top tray 38 and in stack 42.

| DECURLER SELECTION TABLE | | | | |
| --- | --- | --- | --- | --- |
| Output Selected | Excessive Upcurl in Stack | Excessive Downcurl in Stack | Excessive Upcurl in Top Tray | Excessive Downcurl in Top Tray |
| Non inverting | Entrance Decurler | Exit Decurler | Entrance Decurler | Exit Decurler |
| Inverting | Exit Decurler | Entrance Decurler | Exit Decurler | Entrance Decurler |

Using the table above, if a print request selects a non-inverted output and there is excessive downcurl in stack 42, the exit decurler 34 should be activated to remove or reduce such curl. If an inverted output is desired for a print request, and there is excessive downcurl in the sheet(s) in top tray 38, entrance decurler 32 should be activated to remove or reduce such curl. Additionally, the magnitude of the indent of the selected decurlers should be chosen. For example, in some embodiments, for a larger curl, a larger magnitude is selected. In the example shown in FIG. 5, based on real image 60 received in step 204 and and/or the first input received in step 208, AR decurling settings analysis program 140 displays, via icons 64, the recommended decurler values: activate duplex decurler 28 to a magnitude of 10, deactivate or do not activate entrance decurler 32 (i.e., set at a magnitude of 0), and activate exit decurler 34 to a magnitude of 8.

In step 212, AR decurling settings analysis program 140 receives a second input from the operator. In some embodiments, the second input includes an acceptance of the decurler settings proposed in step 210 (i.e., as shown by icons 64 in FIG. 5). The second input may also include an alteration of the decurler settings proposed in step 210. For example, the operator may determine that setting duplex decurler 28 to a magnitude of 10 is too extreme, and instead may input a magnitude of 7.

Figure 6:
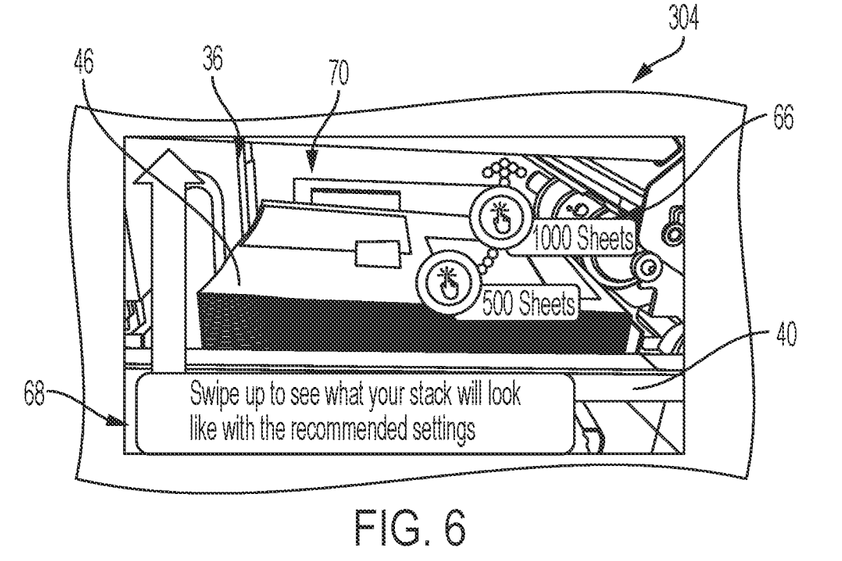
FIG. 6 is a front view of a portion of a display screen showing an embodiment of an icon of an application.

In step 212, AR decurling settings analysis program 140 displays an augmented image which shows the operator a prediction of what the stack will look like if the print request is completed using the decurler settings received in step 212. FIG. 6 is a front view of portion of a display screen 304 showing an embodiment of an icon of AR decurling settings analysis program 140. Display screen 304 shows augmented image 70. Augmented image 70 may include real image 60 with a virtual overlay. For example, augmented image 70 may show first portion 44 as a real image and an overlay of the remaining sheets virtually, which together forms estimated stack 46. Providing virtual imaging on top of real imaging is well known in the art of AR. In some embodiments, estimated stack 46 is shown completely as a virtual image.

In some embodiments, in an additional or alternative step, AR decurling settings analysis program 140 displays one or more additional icons prompting additional input from the operator. For example, AR decurling settings analysis program 140 may display icons 68 directing the operator to "swipe up to see what your stack will look like with the recommended settings." Upon the operator swiping up or providing an input, AR decurling settings analysis program 140 displays the augmented image 70. In another example, AR decurling settings analysis program 140 displays icons 66 directing the operator to choose the projected stack size. For example, the operator can choose to see the projected stack size and geometry for a 500 sheet stack or a 1,000 sheet stack.

Figure 7:
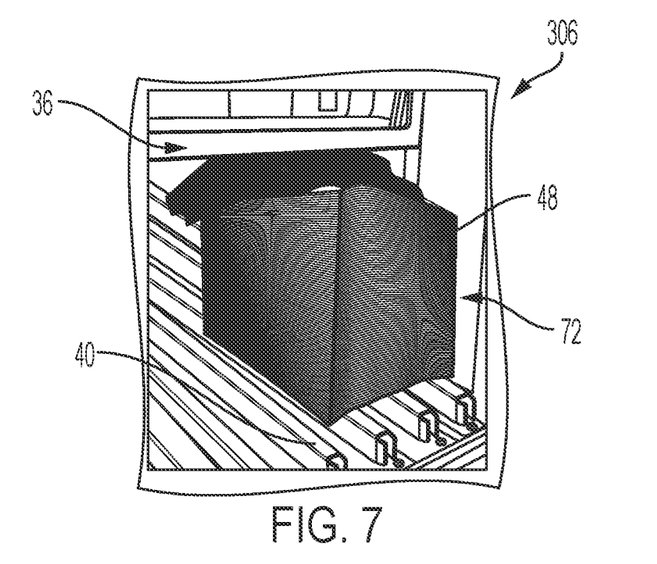
FIG. 7 is a front view of a portion of a display screen showing an embodiment of an icon of an application.

FIG. 7 is a front view of portion of a display screen 306 showing an embodiment of an icon of AR decurling settings analysis program 140. display screen 306 shows augmented image 72. Augmented image 72 shows a prediction of, not only the projected stack size and geometry of completing the print request under the current decurler settings, but also what will happen if pallet 40 is ejected from output module 36 once the print request is completed (or the maximum stack size is reached). In the example shown in FIG. 7, under the current decurler settings, estimated stack 48 will exceed the maximum stack size and prevent proper ejection of the stack on pallet 40. By illustrating the potential problems of current decurler settings, an operator may be more alert to such decurler settings.

FIG. 7 shows a "stack break," which is when a stack is divided into at least two visually-distinct parts. A stack break is undesirable in an output stack as well as in an input stack. Stack break differs from stack offsetting, which is offsetting regular amounts of sheets or sets in a controlled manner. Thus, a stack break is an uncontrolled random break due to stack unevenness whereas stack offsetting is a controlled purposeful break.

It should be appreciated that while the present disclosure describes use of the system and method for curling in printed sheets, the same system and method can be used to analyze specialty sheets to illustrate the potential problems that may occur if a stack of a certain size builds up on pallet 40 in output module 36. For example, AR decurling settings analysis program 140 might show a display similar to that of FIG. 7 the number of specialty sheets including a card printed exceeds 1,000.

In some embodiments, the present disclosure comprises a method of analyzing operational settings for an apparatus processing a plurality of sheets (e.g., a printing device, a decurler, a stapler, a binder, etc.). In a first step of the method, AR decurling settings analysis program 140 receives real image 60 of the plurality of sheets, for example, stack 42 or first portion 44. The real image 60 may include stack 42 or first portion 44 arranged on feeder tray 14 and/or feeder module 12 or pallet 40. In a second step, AR decurling settings analysis program 140 receives a first input relating to the processing of the plurality of sheets. The first input may include at least one of a sheet stock weight, a sheet size, a sheet coating, a sheet grain direction, a simplex or duplex print, a sheet weight, a sheet ink coverage, a sheet color, and an output orientation setting, and a curvature of the sheet (e.g., whole-page curl, local curl, cockle, etc.). In a third step, AR decurling settings analysis program 140 processes the plurality of sheets according to data derived from the first real image and the first output. In some embodiments, AR decurling settings analysis program 140 detects a curvature of the plurality of sheets. For example, AR decurling settings analysis program 140 determines if the plurality of sheets comprises a whole-page curl, a local curl, or a cockle. The data may be derived at least in part from the detected curvature of the plurality of sheets. In some embodiments, AR decurling settings analysis program 140 receives a second real image of the processed plurality of sheets, a second input relating to the processed plurality of sheets, and processes the processed plurality of sheets according to the data derived from the second real image and the second input.

Figure 8:
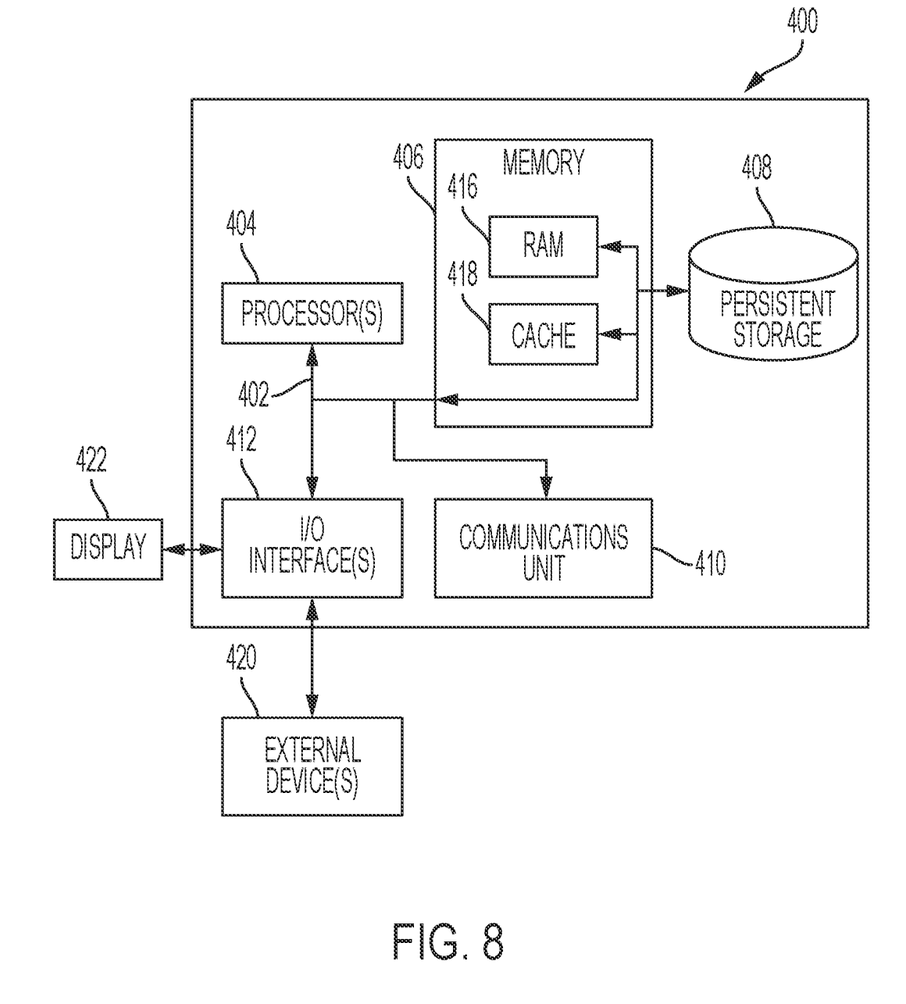
FIG. 8 is a block diagram of internal and external components of a computer system, in accordance with some embodiments of the present disclosure.

FIG. 8 is a block diagram of internal and external components of computer system 400, which is representative of the computing device of FIG. 2, in accordance with some embodiments of the present disclosure. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Printing system
12 Feeder module
14 Feeder tray
16 Loop
18 Print head or marker
20 Dryer or fuser or curer
22 Gate
24 Gate
26 Inverter
28 Decurler
30 Curling module
32 Decurler
34 Decurler
36 Output module
38 Top tray or proofing tray
40 Pallet
42 Stack or sheets
44 First portion
46 Estimated stack
48 Estimated stack
50 Camera
60 Real image
62 Icons or prompts
64 Icons or prompts
66 Icons or prompts
68 Icons or prompts
70 Augmented image
72 Augmented image
80 Central controller
100 Augmented reality (AR) decurling settings analysis environment
110 Network
120 Database
130 Input data
140 Augmented reality (AR) decurling settings analysis program
200 Flowchart
202 Step
204 Step
206 Step
208 Step
210 Step
212 Step
214 Step
300 Portion of display screen
302 Portion of display screen
304 Portion of display screen
306 Portion of display screen
400 Computing device
402 Communications fabric
404 Processing units
406 Memory
408 Persistent storage
410 Communications unit
412 Input/output (I/O) interfaces
416 Random access memory (RAM)
418 Cache memory
420 External device(s)
422 Display
D Direction

What is claimed is:

1. A method of analyzing decurling settings for a print request comprising a plurality of sheets, the method comprising:
    receiving a real image of a first portion of a stack of the plurality of sheets with an image capturing device;
    receiving a first input;
    displaying one or more decurler settings on an interface to thereby allow selection of the one or more of the decurler settings;
    receiving a selection of the one or more of the decurler settings; and,
    displaying a first augmented image of the stack of the plurality of sheets, the first augmented image comprising a predictive image of the stack of the plurality of sheets based on the real image and one or more of the received first input and/or one or more of the selected decurler settings.

2. The method as recited in claim 1, wherein the step of receiving the first input comprises:
    receiving one or more factors related to the print request.

3. The method as recited in claim 2, wherein the one or more factors comprises at least one of a sheet stock weight, a sheet size, a sheet coating, a sheet grain direction, a simplex or duplex print, a sheet weight, a sheet ink coverage, and an output orientation setting.

4. The method as recited in claim 1, further comprising:
    prior to receiving the first input, displaying one or more factors related to the print request.

5. The method as recited in claim 1, further comprising:
    after displaying the one or more decurler settings, receiving a second input.

6. The method as recited in claim 5, wherein the second input relates to the one or more decurler settings.

7. The method as recited in claim 5, wherein the second input relates to a request to display the first augmented image of the stack of the plurality of sheets.

8. The method as recited in claim 1, wherein the step of displaying the first augmented image of the stack of the plurality of sheets comprises:
based on at least one of the real image, the first input, and the displayed decurler settings, predicting a geometry of the stack formed by the plurality of sheets.

9. The method as recited in claim 1, further comprising, after the step of displaying the first augmented image of the stack of the plurality of sheets:
receiving a second input adjusting the one or more decurler settings; and,
displaying a second augmented image of the stack of the plurality of sheets.

10. The method as recited in claim 1, further comprising:
from the real image, detecting a curvature of the plurality of sheets.

11. The method as recited in claim 1, further comprising:
from the real image, determining if the plurality of sheets comprises a whole-page curl, a local curl, or a cockle.

12. A system for analyzing decurling settings for a print request comprising a plurality of sheets, the system comprising:
one or more computer processors;
one or more computer readable storage media;
a camera;
program instructions stored on the computer readable storage media for execution by at least one of the one or more computer processors, the program instructions comprising:
program instructions to receive a real image of at least one sheet of the plurality of sheets with the camera;
program instructions to receive a first input;
program instructions to display one or more decurler settings on an interface to thereby allow selection of the one or more of the decurler settings; and,
program instructions to display a first augmented image of a stack of the plurality of sheets, the first augmented image comprising a predictive image of the stack of the plurality of sheets based on the real image and one or more of the received first input and/or one or more of the selected decurler settings.

13. The system as recited in claim 12, wherein the program instructions to receive the first input comprise:
receiving one or more factors related to the print request.

14. The system as recited in claim 13, wherein the one or more factors comprises at least one of a sheet stock weight, a sheet size, a sheet coating, a sheet grain direction, a simplex or duplex print, a sheet weight, a sheet ink coverage, and an output orientation setting.

15. The system as recited in claim 12, further comprising:
program instructions to, prior to receiving the first input, display one or more factors related to the print request.

16. The system as recited in claim 12, further comprising:
program instructions to, after displaying the one or more decurler settings, receive a second input.

17. The system as recited in claim 16, wherein the second input relates to the one or more decurler settings.

18. The system as recited in claim 16, wherein the second input relates to a request to display the first augmented image of the stack of the plurality of sheets.

19. The system as recited in claim 12, wherein the program instructions to display the first augmented image of the stack of the plurality of sheets comprise:
program instructions to, based on at least one of the real image, the first input, and the displayed decurler settings, predict a geometry of the stack formed by the plurality of sheets.

20. The system as recited in claim 12, further comprising, after the program instructions to display the first augmented image of the stack of the plurality of sheets:
program instructions to receive a second input adjusting the one or more decurler settings; and,
program instructions to display a second augmented image of the stack of the plurality of sheets.

21. The system as recited in claim 12, wherein the camera is fixed relative to the stack.

22. A method of analyzing decurling settings for a print request comprising a plurality of sheets, the method comprising:
receiving, by a camera, a real image of a first portion of the plurality of sheets;
displaying one or more decurler settings on an interface to thereby allow selection of the one or more of the decurler settings;
receiving a selection of the one or more of the decurler settings; and,
based on the real image, displaying, by one or more computer processors, an augmented image of a stack of the plurality of sheets, the augmented image comprising a predictive image of the stack of the plurality of sheets based on the real image and one or more of the selected decurler settings.

23. The method as recited in claim 22, wherein the step of displaying the augmented image of the stack of the plurality of sheets comprises:
determining, by the one or more computer processors, a first geometry of the first portion in the real image; and,
predicting, by the one or more computer processors, a second geometry of the stack.

24. A method of analyzing operational settings for an apparatus processing a plurality of sheets, the method comprising:
receiving a first real image of the plurality of sheets;
receiving a first input relating to the processing of the plurality of sheets; and,
displaying a first augmented image of a stack of the plurality of sheets, the first augmented image comprising a predictive image of the stack of the plurality of sheets based on the real image and the received first input and,
processing the plurality of sheets according to data derived from the first real image and the first input.

25. The method as recited in claim 24, wherein the processing includes printing on the plurality of sheets.

26. The method as recited in claim 24, wherein the processing includes decurling the plurality of sheets.

27. The method as recited in claim 24, wherein the processing includes displaying an augmented image of a stack of the plurality of sheets on a display device.

28. The method as recited in claim 24, wherein the first real image of the plurality of sheets comprises a stack of the plurality of sheets.

29. The method as recited in claim 24, wherein the stack of the plurality of sheets is arranged on an input side of the apparatus or an output side of the apparatus.

30. The method as recited in claim 24, further comprising:
from the first real image, detecting a curvature of the plurality of sheets, wherein the data is derived at least partially from the curvature.

* * * * *